May 22, 1956 W. R. DRESSER 2,747,012

CLOSED LINK ELECTRONIC CAMERA CHAIN

Filed April 10, 1953 2 Sheets-Sheet 1

INVENTOR.

Willis Robert Dresser

BY Emery, Varney, Whittemore & Dix

ATTORNEYS

May 22, 1956 W. R. DRESSER 2,747,012

CLOSED LINK ELECTRONIC CAMERA CHAIN

Filed April 10, 1953 2 Sheets-Sheet 2

INVENTOR.
Willis Robert Dresser

BY Emery, Varney, Whittemore & Dix,

ATTORNEYS

United States Patent Office 2,747,012

Patented May 22, 1956

2,747,012

CLOSED LINK ELECTRONIC CAMERA CHAIN

Willis Robert Dresser, Long Hill, Conn., assignor to The Vitarama Corporation, Huntington, N. Y., a corporation of New York Application April 10, 1953, Serial No. 348,047

6 Claims. (Cl. 178—5.4)

This invention relates to closed link electronic cameras, and the invention can be adapted to the production of films for mosaic picture projection, including the making of color pictures.

It is an object of the invention to provide an improved electronic camera apparatus, and more especially a closed link camera chain in which scenes focused on the face plate of a picture tube are transmitted by electric impulses to receiver tubes from which the images are supplied to recording cameras in which the films are moved in timed relation with the scanning period of the picture tubes.

One feature of the invention relates to the control of the film movement and the scanning period of both the picture tube and the receiver tube by common control means that insure perfect synchronization in the operation of the apparatus. In the preferred embodiment of the invention, the film moves continuously and the receiver tube has horizontal but no vertical scanning, the movement of the film supplying the vertical component for the scanning pattern.

The closed link feature of the invention permits sequential scanning to produce the image on the film. Freedom to use sequential scanning obtains a number of advantages. In addition to the advantage of being able to move the film continuously, which would not be possible with an interlaced pattern, sequential scanning makes it easier to obtain accurate registration of the lines. Movement blur, caused by the formation of double images, and line crawl, are eliminated. It is not necessary to produce an exact number of lines per frame, and the number of frame-suppression periods per picture is reduced from two to one, thus materially increasing the "time efficiency" of the system.

Another advantage of the invention is that any number of negatives may be produced at one time, thus eliminating the danger of loss which is present in the case of single negatives produced by cinematograph cameras. The invention also makes possible the imaging of the scene being photographed at the same time that the photographic recording is going on. This enables the director and any control technicians to watch the scene which is actually being reproduced on the photographic negative.

Other objects, features and advantages of the invention will appear or be pointed out as the description proceeds.

In the drawing, forming a part hereof, in which like reference characters indicate corresponding parts in all the views.

Figure 1:
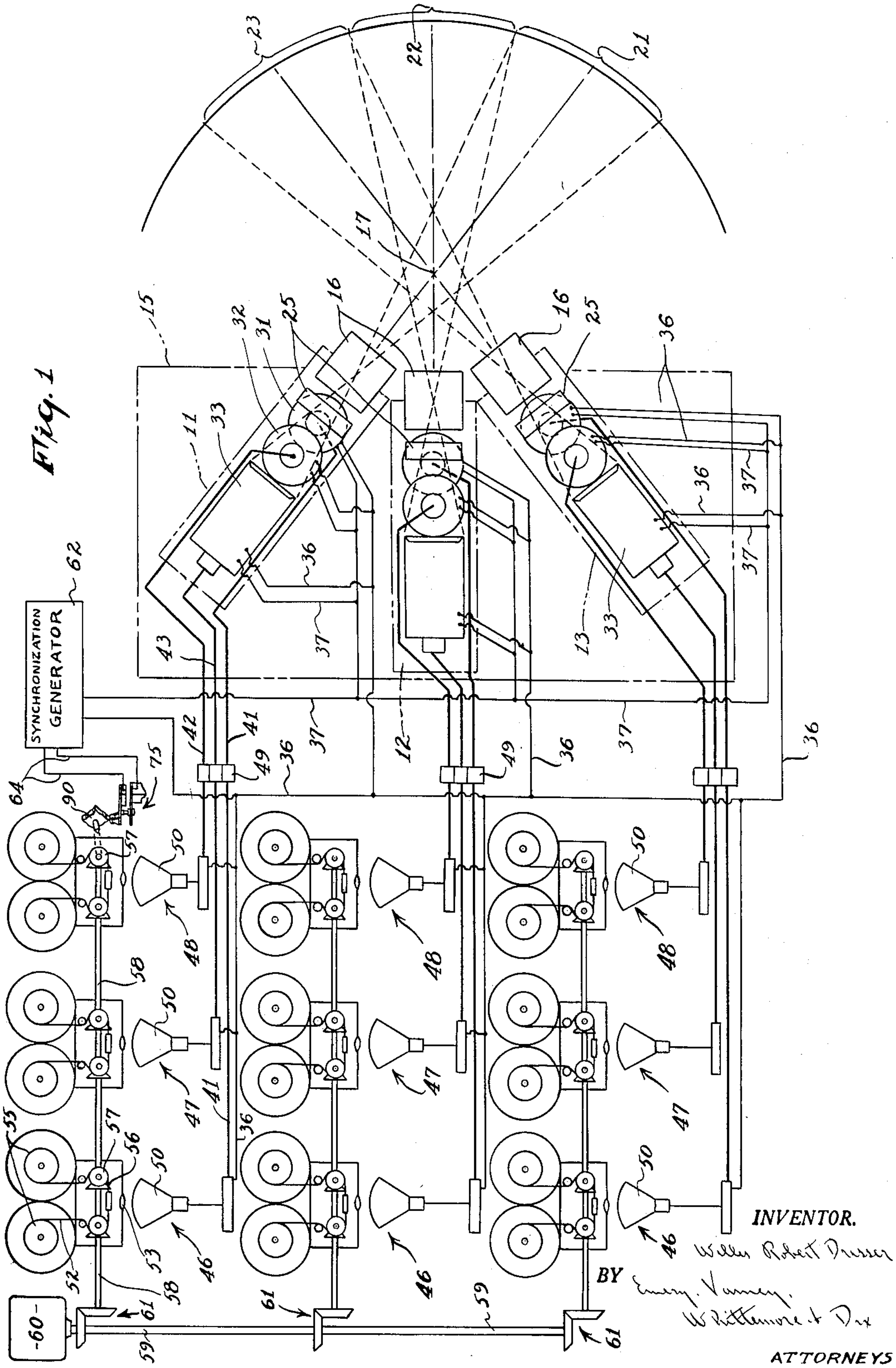
Figure 1 is a diagrammatic view showing a closed link electronic camera chain embodying this invention.

Although the invention can be applied to an electronic camera having only one camera head, the preferred embodiment includes a plurality of camera heads for photographing adjacent portions of a wide scene for subsequent projection in a mosaic picture. Three camera heads, 11, 12 and 13, are connected to a common support 15 in a predetermined angular relation to one another. Each of the camera heads includes a lens and lens mount 16. The cameras are disposed on the support 15 with the axes of the lenses converging to a crossover point 17. The camera head 11 focuses on a scene extending throughout an arc 21; and the camera heads 12 and 13 focus on scenes extending throughout adjacent arcs 22 and 23, respectively.

The overlapping of the field of view at a distance from the cameras, and the corrections for parallax with change of focus form no part of the present invention, these adjustments being well understood in the multilens camera art. The camera heads 11, 12 and 13 may be used for the production of black and white negatives, or may be used for making color separation negatives. The invention will be described for making color separation negatives, and when the camera heads are used for this purpose, each camera is preferably equipped with a trifilter 25.

Figures 2, 3:
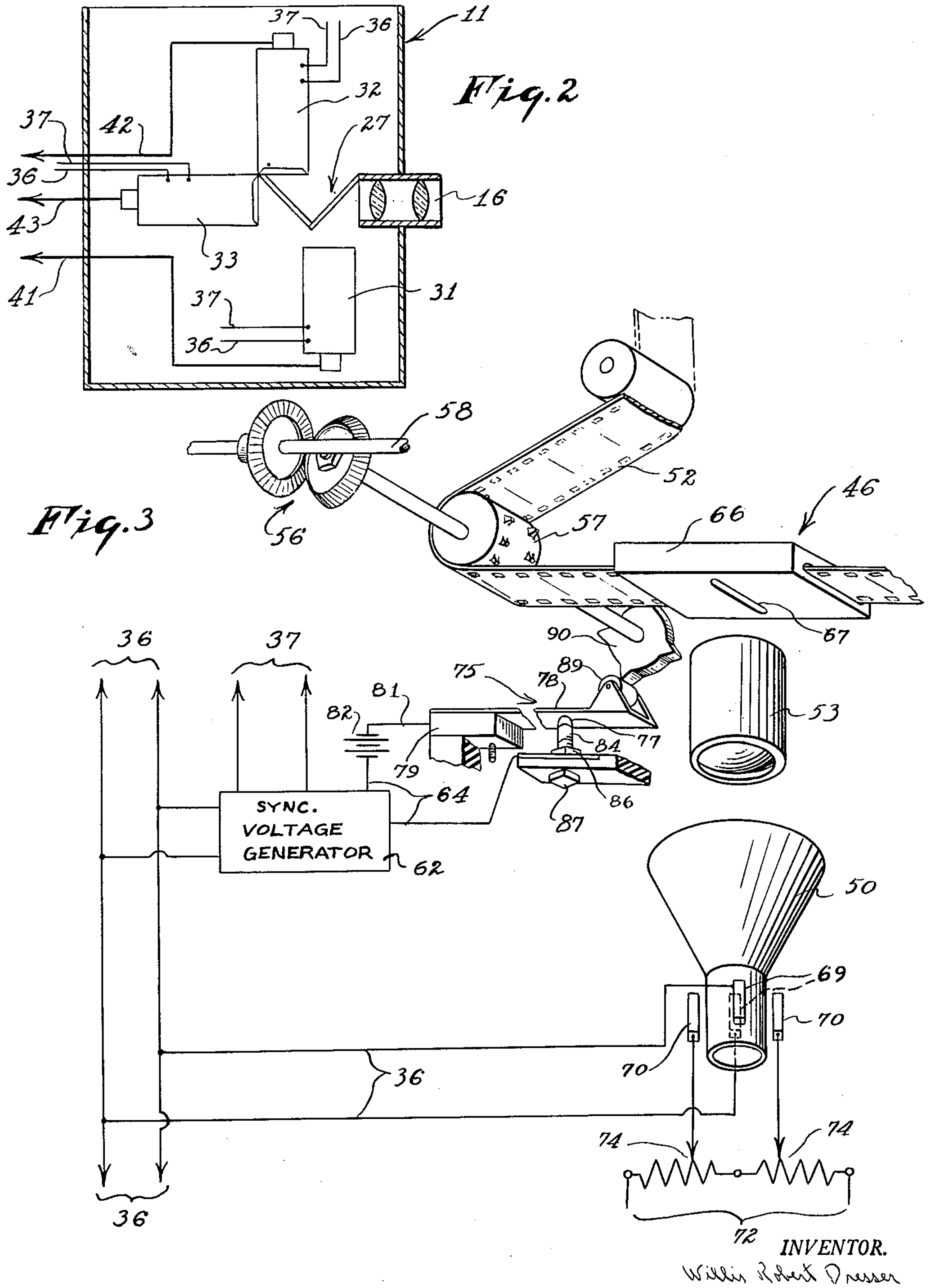
Figure 2 is an enlarged diagrammatic view showing the interior of one of the camera heads of the electronic camera chain shown in Figure 1.
Figure 3 is an exploded, diagrammatic view of a portion of one of the photographic recorders, together with the synchronization control switch for maintaining the time relation between the film movement and the vertical scanning of the picture tubes.

The interior of the camera head 11 is shown in Figure 2. The camera heads 12 and 13 are of similar construction. There is a beam splitter and color separator 27 behind the lens and lens mount 16. This color separator includes dichromic mirrors, one of which reflects the blue component of the light downwardly to an image photo tube or picture tube 31. The red component of the light is reflected upwardly to a picture tube 32; and the green component of the light passes through the color separator to a picture tube 33 located in line with the lens. Each of the picture tubes 31, 32 and 33 has a face plate spaced from the lens by the same total distance so that the lens focuses a picture on all of the face plates at the same time.

The wiring for the picture tubes is shown diagrammatically. A conductor 36 is connected with each of the tubes for supplying the deflection signals for the horizontal or X axis, scanning; and a conductor 37 supplies the deflection signals for the vertical or Y axis, scanning. The output of the picture tube 31 is supplied to a photographic recorder through a conductor 41. The output from the picture tubes 32 and 33 is supplied to photographic recorders through conductors 42 and 43, respectively, as shown in Figure 1.

There are separate photographic recorders 46, 47 and 48 for the signals supplied through the conductors 41, 42 and 43, respectively. There are preamplifiers 49 in the circuit of each of the conductors 41, 42 and 43. Each of the photographic recorders includes a cathode ray tube 50 with suitable amplifiers and beam deflecting means such as commonly used for operating an oscillograph. In the preferred construction, however, the photographic receivers 46, 47 and 48 are provided with deflecting means for horizontal scanning only. The line produced by this horizontal scanning is imaged on a film 52 by a lens 53 located between the received tube and the film 52. The magnification of this line on the film is constant, and negligible depth of focus is required because the cathode ray screen is a flat field.

The film 52 is carried on reels 55 located in a housing of the photographic recorder. The film 52 is moved by film driving means which is shown diagrammatically as a sprocket 57 driven from a shaft 58, through suitable gearing 56 from a drive shaft 59 operated by a driving motor 60 through bevel gearing 61. The films in the photographic recorders 47 and 48 are similarly moved by driving means which include the same shaft 58, drive shaft 59 and motor 60. These driving means are merely representative of motion-transmitting connections through which a common power source moves all of the films in the photographic recorders simultaneously and in synchronism.

The conductors from the picture tubes in the camera heads 12 and 13 are indicated by the same reference characters as used for the conductors from the camera head 11; and these conductors from the picture tubes in the camera heads 12 and 13 supply electric impulses to photographic records similar to the recorders 46, 47 and 48, and indicated by these same reference characters. All of the photographic recorders for all of the picture tubes in the camera heads 11, 12 and 13 have their film driving means supplied with power from the same drive shaft 59 and motor 60 so as to insure perfect synchronizing of the movement of all of the films.

The deflection signals for the picture tubes in the camera heads 11, 12 and 13, and for the receiver tubes 50 in all of the photographic recorders 46, 47 and 48, are supplied from a synchronization generator 62. The deflection signal for the horizontal, or X axis, scanning, which may have a frequency of approximately 26,000 cycles, is supplied to the various tubes through the conductor 36. The deflection signals for the vertical, or Y axis, scanning, is supplied to the picture tubes in the camera heads through the conductor 37. This conductor 37 does not connect with the photographic recorders because the recorders do not have vertical scanning. The synchronization generator 62 is controlled from the film movement drive motor 60 through a circuit 64, in a manner which will be explained in connection with Figure 3.

Figure 3 shows one of the photographic recorders 46. The film 52 is driven continuously by the sprocket 57 through a housing 66 in which there is a slot 67. The lens 53 of the photographic recorder focuses an image on the portion of the film which is immediately behind the slot 67.

The receiver tube 50 has deflecting magnets 69 for producing the horizontal deflection for the tube; and has magnets 70 that control the vertical position of the ray. No deflecting signals are supplied to these magnets but they are connected with a constant-voltage power circuit 72, and there are adjustable potentiometers 74 which permit accurate adjustment of the vertical position of the line along which the ray is deflected by the magnets 69. The potentiometers 74 are adjusted so that the line on the face of the tube 50 is imaged on the film which is exposed by the slot 67.

In order to control the vertical scanning period of the picture tubes in timed relation with the movement of the film 52, a synchronization contact switch 75 is operated from the mechanism that moves the film. This switch 75 preferably includes a movable contact 77 connected to an intermediate portion of a spring arm 78 extending from a fixed support 79. The spring arm 78 is a conductor and is connected by a wire 81, to a source of power, such as a battery 82. There is only one switch 75.

The synchronization contact switch 75 also includes a relatively fixed contact 84 at the upper end of a screw which threads through a bracket 86. This screw can be rotated by a manually-operated knob 87 to change the setting of the contact 84 with respect to the stroke of a cam follower 89 secured to the outer end of the spring arm 78. This cam follower 89 is operated by a cam 90 on the shaft with the sprocket 57.

The cam 90 has a plurality of high points which are co-ordinated with the number of teeth on the sprocket 57, there being one cam rise for each picture frame of the film. For example, if there are four sprocket openings for each picture frame of the film, then there will be one-fourth as many high points on the cam 90 as there are teeth on the sprocket 57. It is evident that there must be some multiple of four teeth in the total number around the periphery of the sprocket 57.

The lower contact 85 of the synchronization contact switch 75 is connected with the synchronization voltage generator 62 by one side of the circuit 64, and the other side of the battery 82 is connected with the synchronization generator 62 by another conductor of the circuit 64.

The synchronization generator 62 is constructed so that it begins a new vertical scanning period each time that the synchronization contact switch 75 is closed by the cam 90. This vertical scanning period continues, after the switch 75 is again opened, until the switch 75 is closed by the next succeeding rise on the cam 90. In this way, the synchronizing of the scanning period and the film movement is assured.

The preferred embodiment of the invention has been illustrated and described, but changes and modifications can be made and features can be used in different combinations, without departing from the invention as defined in the claims.

I claim as my invention:

1. An electronic camera including a lens mount, a picture tube behind the lens mount, a photographic recorder including a film exposure station and a receiver tube on which signals from the picture tube reproduce successive light-modulated lines at the same position on the receiver tube and corresponding to the lines scanned on the picture tube behind the lens mount, a lens between the receiver tube and the film exposure station in position to image the light-modulated lines as transverse lines across the film at the exposure station, a common synchronization generator connected with the picture tube and the recorder, film feeding mechanism for the recorder including driving means that move the film with continuous motion and as least as far as a distance equal to the width of the light-modulated line within the time interval between corresponding parts of the cycles of the scanning of the successive lines, and means co-ordinating the signal output of the picture tube with the continuous movement of the film.

2. A closed link electronic camera including a lens mount, a picture tube on which an image is focused by a lens in the lens mount, a photographic recorder, a circuit by which the output from the picture tube is conveyed directly to the recorder, a synchronization generator that supplies signals to both the picture tube and the recorder, the recorder including a cathode ray tube with only one deflecting circuit, said deflecting circuit being in a direction to scan the face of the tube transversely of the film, film feeding mechanism that advances the film longitudinally past the cathode ray tube with continuous motion, a common synchronization generator for the picture tubes and recorder tubes, and control means for the film feeding mechanism to advance the film one frame area for each vertical scanning signals period of the picture tubes.

3. A multi-lens camera including a plurality of camera heads, each of which includes a lens mount and a picture tube to which light passes through the lens mount, a support on which the camera heads are located with the respective camera heads disposed to photograph substantially simultanously scenes in predetermined relation to one another for subsequent projection as a mosaic picture, a plurality of photographic recorders, at least one of which is connected with a different one of the camera heads for reproducing on a receiver tube face the scene imaged on the face plate of the tube to which light passes through the lens mount, the receiver tube having means that deflect a scanning beam along a single line of the tube face to produce successive light-modulated lines at the same position on the tube face, said lines corresponding to the lines scanned by the picture tube, feeding mechanism in each of the recorders for advancing a film with continuous motion past an exposure station at which the film is exposed to the light from the successive light-modulated lines on the receiver tube with said lines extending transversely of the film, and common driving mechanism for all of the receivers and for a synchronization generator that operates the picture tubes and recorders in predetermined time relationship to one another.

4. A multi-lens camera construction for taking adjacent portions of a scene on different films for projection as contiguous sections of a mosaic image, said construction including a plurality of camera heads with lens mounts located along converging axes, a picture tube in each of the camera heads behind the lens mount, a plurality of photographic recorders, a different one of which is connected with each of the picture tubes of the camera heads, each of the recorders including a receiver tube having means that deflect a scanning beam along a single line of the tube face to produce successive light-modulated lines at the same position on the tube face, said lines corresponding to the lines scanned by the picture tube, and means for advancing the film at a rate equal to at least the width of the line on the receiver tube for each deflection of the scanning beam.

5. A multi-lens camera structure including a plurality of camera heads located in position to view continuous sections of a scene which is to be projected from different films as a mosaic image, supporting means by which the camera heads are held in predetermined relation to one another, a picture tube in each of the camera heads, at least one recorder connected with each of the picture tubes, film feeding mechanism that advances reels of different film past the respective recorders for the different camera heads, a synchronization generator that supplies deflection signals for only one axis of the respective recorders but for both axes of the picture tubes, film feed mechanism for each of the recorders, the film feeding mechanism that advances the films with continuous motion in a direction transverse of the direction of deflection of the recorder by the synchronization generator signals, and control means that advance the film feed the length of one frame area for each photographic scanning signal period of the picture tube.

6. A multi-lens color separation camera for taking contiguous sections of a scene to produce a mosaic image, the camera including a plurality of camera heads connected in predetermined angular relation to one another on a common support, a lens mount on each camera head, a plurality of picture tubes in each camera head behind the lens mount, color separators in each camera head in the path of the light beam and in positions to bring light of different colors to the different picture tubes, a conductor connecting each of the picture tubes of the various camera heads with a different photographic recorder, each of the photographic recorders including a picture receiver tube with scanning beam deflection along only one axis, mechanism that advances photographic film past the receiver tubes with continuous motion to supply the other axis of deflection of the scanning beam with respect to the film, and an imaging lens between the receiving tube and an exposure station at which the film is exposed to light, passing from the receiving tube through the imaging lens to the film, a synchronization generator for all of the tubes and photographic recorders, and common power driving means for the synchronization generator and all of the photographic recorders.

References Cited in the file of this patent

UNITED STATES PATENTS

| | | |
|---|---|---|
| 2,531,031 | France | Nov. 21, 1950 |
| 2,600,868 | Hales | June 17, 1952 |
| 2,607,845 | Clark | Aug. 19, 1952 |
| 2,612,553 | Homrighous | Sept. 30, 1952 |
| 2,658,102 | Goldsmith | Nov. 3, 1953 |